United States Patent

[11] 3,540,652

[72] Inventors Frank H. Harrison;
 Karl H. Neuhof, Brussels, Belgium
[21] Appl. No. 795,625
[22] Filed Jan. 31, 1969
[45] Patented Nov. 17, 1970
[73] Assignee Stewart-Warner Corporation
 Chicago, Illinois
 a corporation of Virginia

[54] HEATING SYSTEM FOR A VEHICLE
 6 Claims, 2 Drawing Figs.
[52] U.S. Cl. .................................................... 237/12.3
[51] Int. Cl. .................................................... B60h 1/18,
 B60h 1/22
[50] Field of Search .......................................... 237/2A,
 8A, 12.3I

[56] References Cited
 UNITED STATES PATENTS
 2,009,823 7/1935 Van Vulpen et al. ......... 237/5
 3,273,799 9/1966 Fairbanks et al. ............ 237/2AUX
 3,325,100 6/1967 Fairbanks et al. ............ 237/2AUX

*Primary Examiner*—Edward J. Michael
*Attorney*—Augustus G. Douvas, William J. Newman and Norton Lesser ABSTRACT: Heating systems for a vehicle in which air is delivered by the vehicle engine fan through twin engine exhaust gas heat exchangers and a combustion heater having inputs from both heat exchangers to additionally heat the air distributed to the vehicle cab if the heat available from the exhaust gas heat exchangers is inadequate to meet a desired demand. Auxiliary fan means are provided for causing additional air to flow through both of the vehicle heat exchangers to the booster heater when the output of the vehicle engine fan is inadequate.

FIG.1. INVENTORS
Frank H. Harrison
Karl H. Neuhof.

By William J. Newman
Attorney

INVENTORS
Frank H. Harrison.
Karl H. Neuhof.

HEATING SYSTEM FOR A VEHICLE

This invention relates to a heating system for a vehicle in which air delivered by the vehicle engine fan can be heated by an engine exhaust gas heat exchanger and distributed to the vehicle cab and can be additionally heated by a booster heater in series with the exhaust gas heat exchanger if the heat available from the exhaust gas heat exchanger is inadequate to meet a desired demand.

The invention is a modification of the invention, the subject of U.S. Pat. No. 3,273,799 issued Sept. 20, 1966, to Gordon J. Fairbanks and Kurt Staiger and reissued as Re-26599 on June 3, 1969.

According to the present invention additional fan means are arranged to cause air from outside to flow through twin lines to the booster heater for heating prior to delivery to the cab.

In a preferred embodiment of the invention in which there are twin passages leading from the vehicle engine fan through individual exhaust gas heat exchangers to two entries to the booster heater, a single additional fan may be arranged to provide air from outside to the twin passages, or a pair of additional fans may be arranged one in each of the twin passages. In either case the air may be drawn in directly from outside the vehicle or may be drawn in from outside through the vehicle engine fan.

The air may be supplied to the twin lines upstream of the exhaust gas heat exchanger.

The booster heater may be a fuel-burning heater and the, or another, additional fan could provide combustion air for this heater.

The arrangement can be such that if the vehicle engine is idling or is not running, the additional fan means can be operated to provide air for the booster heater to warm the vehicle cab and this is an improvement over previously proposed systems in which the engine has to be running at a substantial speed to provide sufficient air to heat the cab even if using a booster heater rather than merely using heat derived from the engine.

Of course, as described in U.S. Pat. No. 3,273,799, the booster heater need not be used if the engine is providing sufficient heat.

The invention may be carried into practice in various ways and two embodiments will be described by way of example with reference to the accompanying drawings in which.

Figure 1:
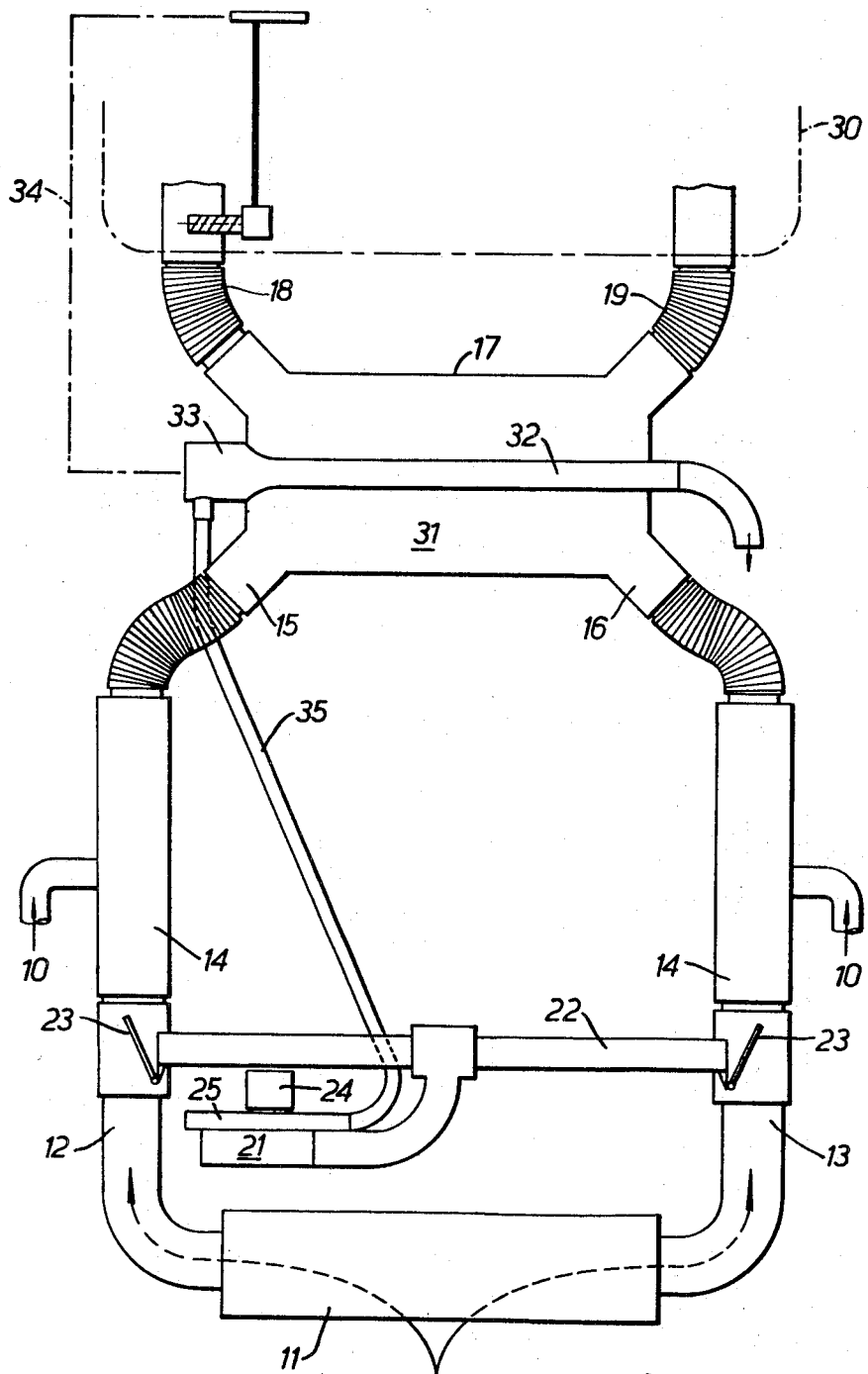
FIG. 1 is a diagram of a vehicle heater using a single additional fan.

In each case the arrangement is generally as described with reference to U.S. Pat. No. 3,273,799 and it can be seen that air for heating the vehicle cab is drawn in through the vehicle engine fan 11 to twin passage ways 12 and 13, each including a heat exchanger 14 which derives its heat from the exhaust gas from the engine as indicated at 10. The heated air outlets from the two heat exchangers are connected to two inlets 15 and 16 to a heat exchange chamber 31 in a booster heater 17. Air heated in the booster heater is led through two outlets 18 and 19 to the vehicle cab 30. The booster heater 17 includes a central chamber 32 including a fuel-burning heater 33 and this central chamber 32 is in heat exchange relationship with the air passing to the cab from the inlets 15 and 16 through the chamber 31. The fuel-burning heater 33 can be switched off or on by means shown diagrammatically at 34, in dependence on the relationship between the temperature of the air passing to the cab and a predetermined temperature so that the booster heater is only switched on when there is inadequate heat coming from the exhaust gas heat exchangers, to maintain the air temperature in the cab perhaps if the engine is idling.

However, it may be that with the engine idling, the vehicle engine fan 11 cannot supply enough air to the booster heater 17 for raising the temperature in the cab to the predetermined temperature, and accordingly an additional fan 21 is provided as shown in FIG. 1 for drawing in air from outside to a cross passage 22 leading to the twin passages 12 and 13 leading to the exhaust gas heat exchangers 14. Normally closed valves 23 control the exits from the passage 22 to the twin passages 12 and 13 and the valves 23 are only open if the pressure in the twin passage due to operation of the additional fan 21 is greater than the pressure in the twin passages. The additional fan may be driven by the same electric motor 24 that drives a fan 25 for providing combustion air through a passage 35 to the fuel-burning heater 33. Alternating a single fan could fulfill the function of both fans 21 and 25.

As long as the additional fan 21 is operating, at least a predetermined minimum flow rate of air will occur, the minimum being determined by the output of the fan 21 so that even though the vehicle engine may be turned off or only turning over slowly this minimum amount of air will flow. At higher speeds the vehicle engine fan 11 takes over and establishes the air flow rate in the system and then the additional fan 21 could be arranged to be switched off automatically.

Figure 2:
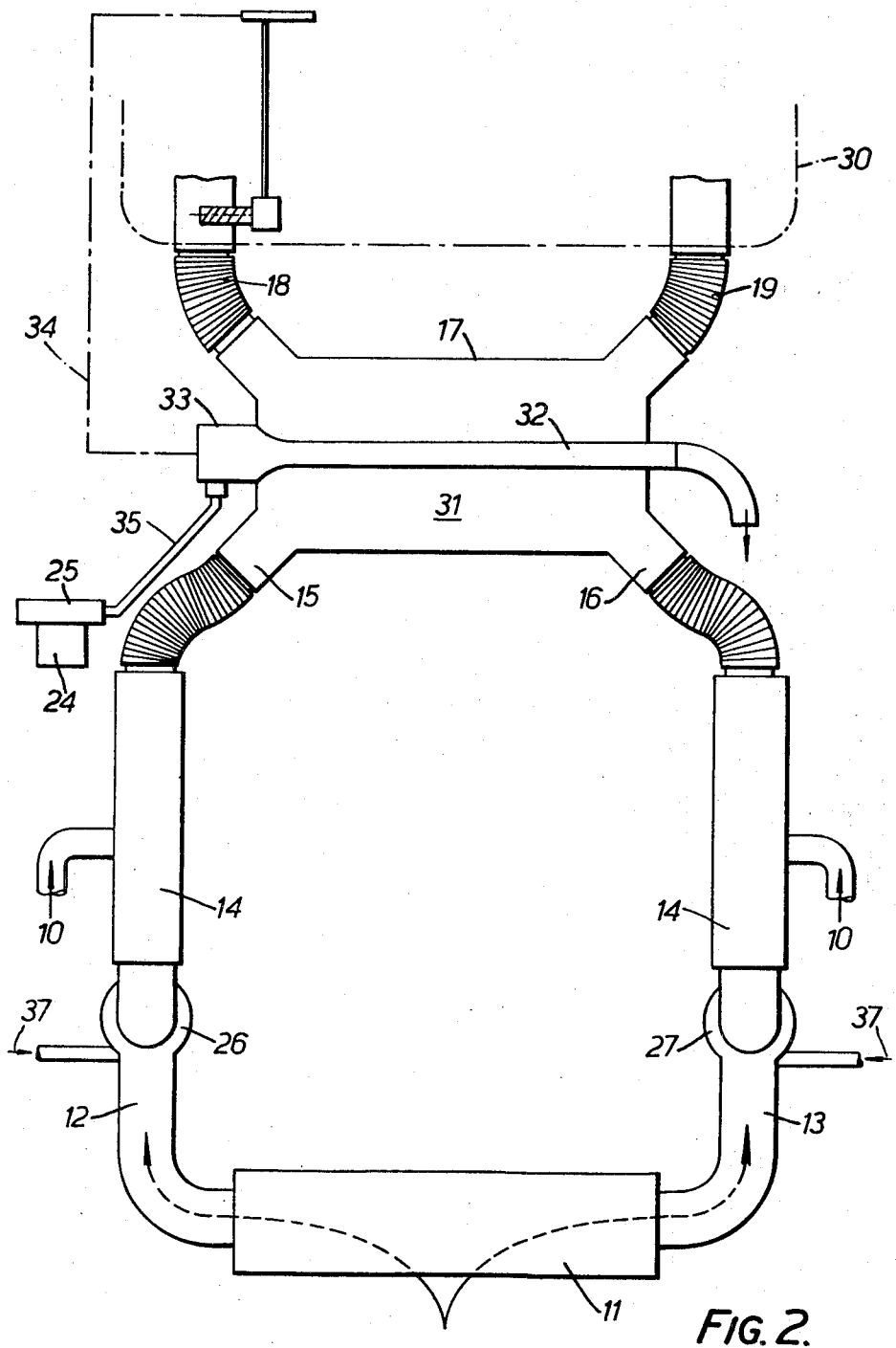
FIG. 2 is a similar diagram of a modification using two additional fans.

The arrangement of FIG. 2 is similar except that instead of the additional fan 21 and passage 22, there are two additional fans 26 and 27 each connected in one of the twin passages 12 and 13 immediately upstream of the exhaust gas heat exchangers 14. In the system shown no valves are required between the additional fans 26 and 27 and the twin passages 12 and 13 because they are in series and in fact draw their air from the outside through the vehicle engine fan 11. The air could, of course, be drawn from outside through valves without passing through the engine fan, as indicated generally at 37.

In other respects operation of either system can be as described in U.S. Pat. No. 3,273,799 and all features of that specification are optional features of this invention.

We claim:

1. In a vehicle cab heating system comprising means for exchanging heat between the vehicle engine exhaust gas and air passing therethrough, means for distributing heated air to the vehicle cab, a booster heater series connected between said exhaust gas heat exchanging means and said distributing means, a vehicle engine-driven fan, means for connecting the output of said engine-driven fan to the input of said exhaust gas heat exchanging means for directing air through said heat exchanger, said booster heater and said distributing means to the vehicle cab, and means for providing additional air to the input of said exhaust gas heat exchanging means when the flow rate of the air provided by the vehicle engine fan is below a predetermined minimum.

2. In the system of claim 1 wherein said additional air providing means comprises a blower positioned outside of said connecting means and means for passing air from the blower to the input of said exhaust gas heat exchanger.

3. In the system of claim 1 wherein said additional air providing means comprises a blower positioned inside the connecting means between said engine fan and said exhaust gas heat exchanging means.

4. In the system of claim 1 wherein said exhaust gas heat exchanging means comprise a pair of heat exchangers, said connecting means comprise a pair of air lines each of which is connected between said vehicle fan and one of said heat exchangers and said additional air-providing means comprising a blower positioned outside of said air lines and a pair of air conduits connecting said blower to the input of said heat exchangers.

5. In the system of claim 4 wherein said air-providing means comprises check valve means in each of said air conduits for passing air from said blower to said heat exchangers when the flow rate of the air from said vehicle fan is below a predetermined minimum.

6. In the system of claim 1 wherein said exhaust gas heat exchanging means comprise a pair of heat exchangers, said connecting means comprise a pair of air lines each of which is connected between said vehicle fan and one of said heat exchangers and said additional air-providing means comprises a pair of blowers each of which is positioned inside of one of said air lines.